Dec. 15, 1925.
A. W. JONES
1,566,017
WHEEL
Filed Sept. 12, 1925
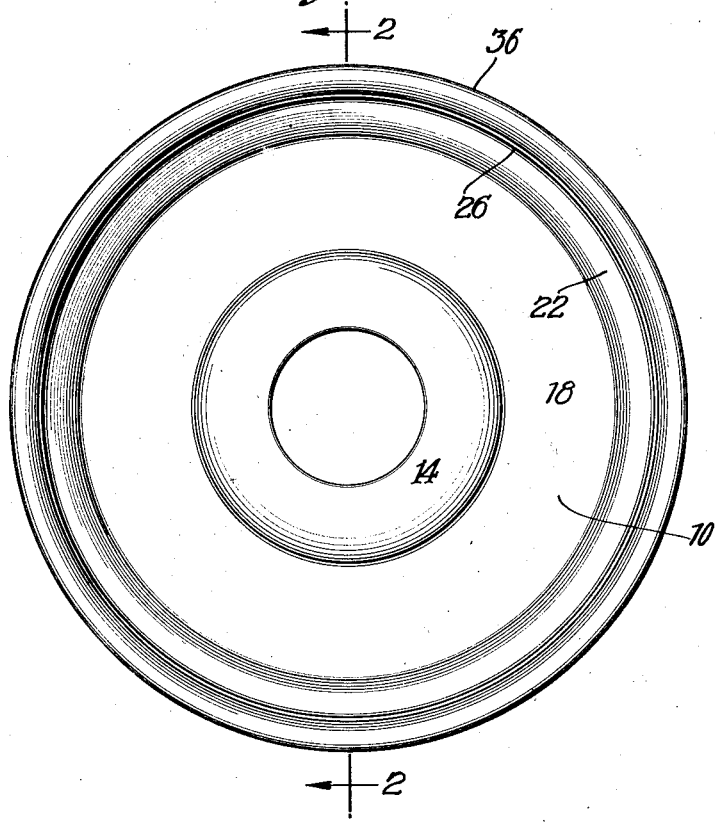
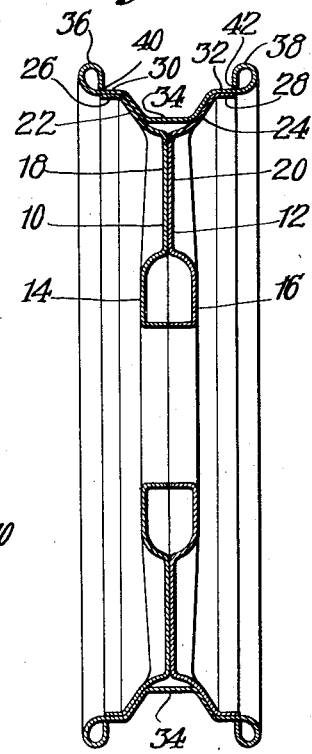
Inventor
ARTHUR WILLIAM JONES.
By His Attorney Patented Dec. 15, 1925.

1,566,017

UNITED STATES PATENT OFFICE.

ARTHUR WILLIAM JONES, OF BIRMINGHAM, ENGLAND, ASSIGNOR TO DUNLOP TIRE AND RUBBER CORPORATION OF AMERICA, OF BUFFALO, NEW YORK, A CORPORATION OF NEW YORK.

WHEEL.

Original application filed January 16, 1925, Serial No. 2,920. Divided and this application filed September 12, 1925. Serial No. 55,990.

*To all whom it may concern:*

Be it known that I, ARTHUR WILLIAM JONES, a subject of the King of Great Britain, and resident of Birmingham, England, have invented certain new and useful Improvements in Wheels, of which the following is a specification.

The invention relates to improvements in wheels of the type having a metal rim and a metal felloe generally known as artillery wheels. My improved wheel includes a felloe having flanged sides which embrace the rim or a portion thereof the rim being secured to the wheel at the circumference preferably by electrically welding.

An embodiment of the invention is illustrated in the accompanying drawings in which—

Fig. 1 is a side view; and
Fig. 2 is a cross-section on line 2—2 of Fig. 1.

Referring in detail to the drawings, the wheel comprises two separately formed side plates 10 and 12 which are preferably united to one another by electric welding. The side plates include offset hub portions 14 and 16, disc-like central portions 18 and 20 and felloe portions 22 and 24, the latter terminating in substantial horizontal portions 26 and 28 which embrace annular flat portions 30 and 32 formed on the rim 34. The rim is of the contour shown best in Fig. 2 and includes beads 36 and 38 formed by bending over the extreme ends of the rim so that the edges 40 and 42 touch or nearly touch the flat portions 30 and 32. The rim is preferably secured to the felloe portion of the wheel by electrically welding. These parts may be united in the manner disclosed in my co-pending application, Serial No. 2920 filed January 16, 1925, of which this case is a division. My prior application discloses a method in which the weld between the flanges of the felloe portions of the wheel and the flat portions of the rim is effected by means of an electric current applied through roller-like electrodes which exert a pressure upon the parts being welded.

While I have described and shown a wheel of specific cross-section contour, it is not to be construed that I am limited thereto as various modifications may be made without departing from the scope of the invention as defined in the appended claim.

What I claim is:—

A wheel of the type described comprising in combination a separately formed rim which in cross section has a depressed central portion and outwardly extending horizontal edge portions, each of said edge portions terminating in a peripheral bead bent inwardly and downwardly and terminating substantially in contact with the outer surface of the horizontal portion, and two separately formed side plates integrally united one with another in the median plane of the wheel from the hub to the felloe, said felloe shaped to engage the sides of the depressed portion of the rim and having outwardly extending horizontal portions adapted to engage the edge portions of the rim.

In witness whereof, I have hereunto signed my name.

ARTHUR WILLIAM JONES.